US012490950B2

(12) United States Patent
Ledan et al.

(10) Patent No.: US 12,490,950 B2
(45) Date of Patent: Dec. 9, 2025

(54) BIOPSY POSITIONER FOR MAMMOGRAPHY IMAGING SYSTEM

(71) Applicant: GE Precision Healthcare LLC, Wauwatosa, WI (US)

(72) Inventors: Mathieu Ledan, Saint-Cyr-l'École (FR); Renaud Lecoeur, Chamboi (FR); Ayoub Denguir, Chaville (FR); Thierry Bayle, Ponthévrard (FR)

(73) Assignee: GE Precision Healthcare LLC, Wauwatosa, WI (US)

( * ) Notice: Subject to any disclaimer, the term of this patent is extended or adjusted under 35 U.S.C. 154(b) by 304 days.

(21) Appl. No.: 18/135,452

(22) Filed: Apr. 17, 2023

(65) Prior Publication Data

US 2024/0341709 A1 Oct. 17, 2024

(51) Int. Cl.
| | |
|---|---|
| *A61B 6/50* | (2024.01) |
| *A61B 6/00* | (2024.01) |
| *A61B 6/04* | (2006.01) |
| *A61B 6/46* | (2024.01) |
| *A61B 10/02* | (2006.01) |
| *A61B 50/20* | (2016.01) |

(52) U.S. Cl.
CPC ............ *A61B 6/502* (2013.01); *A61B 6/0414* (2013.01); *A61B 6/4435* (2013.01); *A61B 6/461* (2013.01); *A61B 6/467* (2013.01); *A61B 6/54* (2013.01); *A61B 10/02* (2013.01); *A61B 50/20* (2016.02)

(58) Field of Classification Search
CPC ..................................................... A61B 90/17
See application file for complete search history.

(56) References Cited

U.S. PATENT DOCUMENTS

| 9,750,469 | B2 | 9/2017 | Albanese et al. | |
|---|---|---|---|---|
| 2010/0249648 | A1* | 9/2010 | Nakata | A61B 90/11 378/37 |
| 2011/0087132 | A1* | 4/2011 | DeFreitas | A61B 90/11 378/62 |
| 2011/0118625 | A1* | 5/2011 | Akuzawa | A61B 90/11 600/567 |
| 2012/0277625 | A1* | 11/2012 | Nakayama | A61B 6/0414 250/393 |

(Continued)

FOREIGN PATENT DOCUMENTS

GB 2533921 A 7/2016

*Primary Examiner* — David J Makiya
*Assistant Examiner* — Soorena Kefayati
(74) *Attorney, Agent, or Firm* — Boyle Fredrickson S.C (57) ABSTRACT

According to one aspect of an exemplary embodiment of the present disclosure, a medical imaging system includes a gantry having a radiation source, a detector adapted to receive radiation emitted from the radiation source to generate image data and defining a compression surface, a first support structure and a second support structure moveably disposed on the gantry, a controller, and a biopsy positioner attached to one of the first support structure or the second support structure. The biopsy positioner includes a base engaged with the first support structure or the second support structure, and a positioning arm connected to the base, the positioning arm including a first arm moveably connected to the base and a second arm moveably connected to the first arm, wherein the first arm and the second arm are moveable between a vertical position and lateral positions on opposed sides of the base.

17 Claims, 8 Drawing Sheets

(56) References Cited

U.S. PATENT DOCUMENTS

| | | | |
|---|---|---|---|
| 2013/0072816 A1* | 3/2013 | Girgenti | A61B 10/0275 |
| | | | 600/567 |
| 2014/0213895 A1* | 7/2014 | Kuwabara | A61B 5/061 |
| | | | 600/424 |
| 2016/0113599 A1* | 4/2016 | Albanese | A61B 6/469 |
| | | | 600/424 |
| 2018/0035984 A1* | 2/2018 | Schmitt | A61B 6/502 |
| 2018/0168523 A1* | 6/2018 | Vancamberg | A61B 6/0414 |
| 2020/0060632 A1 | 2/2020 | Blaski et al. | |
| 2022/0370052 A1* | 11/2022 | DeFreitas | A61B 10/0275 |
| 2024/0268775 A1 | 8/2024 | Ledan et al. | |
| 2024/0324978 A1* | 10/2024 | Konno | A61B 10/0233 |

\* cited by examiner

BIOPSY POSITIONER FOR MAMMOGRAPHY IMAGING SYSTEM

FIELD OF THE DISCLOSURE

The present disclosure relates generally to medical imaging systems, including mammography systems and devices, and more specifically to component attachment structures for mammography systems.

BACKGROUND OF THE DISCLOSURE

Embodiments of the invention relate generally to X-ray medical imaging, and more particularly to devices, systems and methods employed to perform various imaging procedures, such as mammography imaging procedures including but not limited to spectral mammography (SM), such as 2D/3D dual-energy contrast-enhanced (CE) mammography exams, full-field digital mammography (FFDM) or digital breast tomosynthesis (DBT) mammography exams.

Spectral mammography (SM) is an X-ray imaging modality used to scan breasts for screening, diagnosis and/or interventional examinations. The effectiveness of spectral mammography is affected by numerous factors, one of which is the two-dimensional (2D) rendering of images obtained using SM.

Alternative systems to SM are also known for breast imaging. Some examples include full-field digital mammography, which captures the image directly onto a flat-panel detector, computed radiography, which involves the use of a cassette that contains an imaging plate, or digital breast tomosynthesis (DBT). A digital breast tomosynthesis (DBT) or mammography-tomography (mammo-tomo) system is a dedicated mammography system that acquires several (e.g., tens of) angularly offset projection X-ray images and uses the resulting X-ray image data to reconstruct three-dimensional (3D) image datasets.

The 3D image datasets are used to form various volumetric representations of the imaged breast, including an entire 3D volume of the breast, and various 3D sections of the 3D volume, such as slices or slabs constituting specified thicknesses of the 3D volume oriented to provide the desired view of one or more regions of interest (ROI) detected within the 3D image dataset.

In addition, when the 3D image datasets of the breast have been produced, after being utilized in a suitable diagnosis procedure, they can be utilized to guide a biopsy device employed with the DBT system into the breast to obtain a biopsy of the region of interest (ROI) identified within the 3D image datasets. In DBT systems, the biopsy device is disposed directly on the DBT system in order to be able to perform the biopsy utilizing the 3D image dataset or to use a stereo-pair of camera images of the breast and biopsy device with a subsequent triangulation of the biopsy device to the ROI in the breast to guide the biopsy device to the ROI.

With regard to the use of these DBT mammography systems, the set-up of the system to obtain the images requires the attachment of various devices to the system in order to provide the system with the proper positioning, i.e., compression, of the breast to obtain the image quality desired. In mammography systems, the devices that are attached to the system to perform the imaging and/or biopsy procedure include a compression paddle, a magnification device, and/or a biopsy holder, which is utilized to locate the biopsy device on the mammography system in a location where the biopsy device can perform the desired biopsy procedure under the guidance of the mammography system. When the mammography imaging system is operated in a screening configuration, the compression paddle, and optionally the magnification device or magstand, are connected to the system. Conversely, when the imaging system is employed in a diagnostic configuration, the biopsy positioner or holder and a compression paddle compatible with the operation of the biopsy device on the biopsy holder are secured to the imaging system. In both configurations, the detector is fixed as a part of the imaging system, with the bucky secured to the detector to provide a suitable x-ray transparent breast support surface along with the image enhancing, anti-scatter grid located within the bucky.

In many prior art diagnostic mammography imaging devices, such that disclosed in US Patent Application Publication No. US20200060632, entitled Apparatus And Method For Mammographic Breast Compression, the entirety of which is expressly incorporated herein by reference for all purposes, the mammography system includes a number of dedicated attachment structures positioned thereon. First, with reference to the prior art mammography system illustrated generally at 1010 in FIG. 1A, the mammography system 1010 includes a detector attachment structure 1012 for engaging the detector 1018 to the mammography system 1010. The detector attachment structure 1012 is connected to the gantry 1016 of the mammography system 1010 to provide a fixed and permanent location for the position of the detector 1018 on the mammography system 1010. Further, the detector 1018 can include a bucky 1014 secured directly over the top of the detector 1018 for the mammography system 1010, or in the form of a removable cassette (not shown) or in the form of an integral component of the detector 1018. In any of these configurations for the bucky 1014 on the detector 1018, the detector attachment structure 1012 requires suitable selectively disconnectable electronic connections that can be engaged with the bucky 1014 to enable signals to be transmitted to and from the bucky 1014 to the mammography system 1010 via the bucky attachment structure 1012 for the operation for the bucky 1014.

Figure 1A:
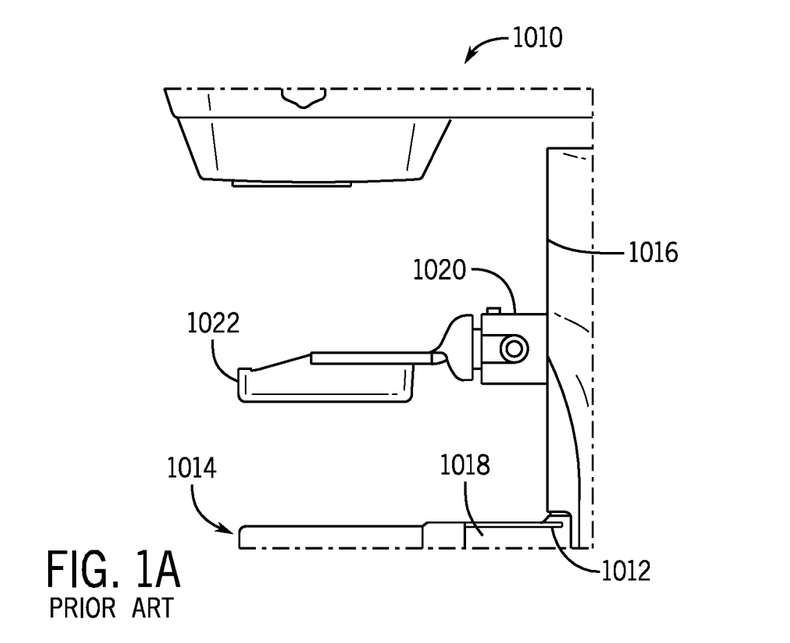
FIGS. 1A and 1B are isometric views of a prior art mammography imaging system.

The mammography system 1010 also includes a paddle attachment structure 1020 disposed on the gantry 1016 above the bucky attachment structure 1012. The paddle attachment structure 1020 provides an attachment point for a compression paddle 1022 on the mammography system 1010. The paddle attachment structure 1020 is vertically moveable with regard to the gantry 1016 in order to enable the paddle 1022 to be moved towards the detector 1018 and the bucky 1014 to provide the required compression to the breast positioned on the detector 1018/bucky 1014 to achieve the desired quality for the images of the breast, i.e., to achieve a uniform thickness to the breast to get a uniform contrast and also to keep the breast in place avoiding blur. The paddle attachment structure 1020 allows the paddle 1022 to be readily switched and/or replaced on the paddle attachment structure 1020 such that the paddle 1022 best suited for use with a particular patient can be quickly and easily secured to the paddle attachment structure 1020. The paddle attachment structure 1020 may also include various features and/or mechanisms therein, such as a motorized paddle shift mechanism that enables the paddle attachment structure 1020 to shift the position of the paddle 1022 on the paddle attachment structure 1020 to better position the paddle 1022 for the imaging procedure to be performed.

Figure 1B:
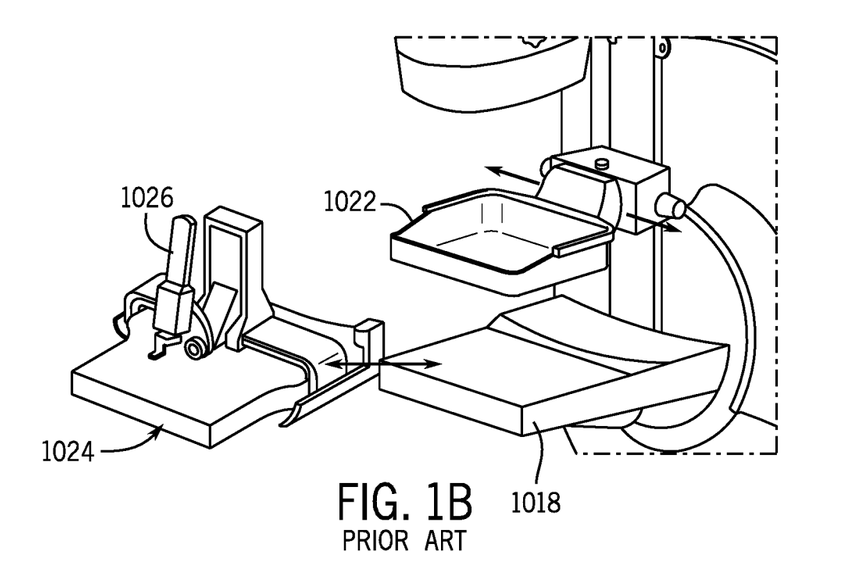

When performing a biopsy procedure, as shown in FIG. 1B, the bucky 1014 can be disengaged from the detector 1018 to enable a biopsy positioner 1024 to be secured to the detector 1018. The biopsy positioner 1024 replaces the bucky 1014, such that in addition to supporting the biopsy device 1026 thereon for use in the biopsy procedure, the biopsy positioner 1024 bucky 1014 therein provide the breast support surface on the detector 1018 and the anti-scatter grid for any images obtained with the biopsy positioner 1024 on the detector 1018 during the biopsy procedure.

While the bucky 1014 or biopsy positioner 1024 can be interchangeably attached to the detector 1018, and the paddle 1022 can be switched on the paddle attachment structure 1020, for the desired operation of the mammography system 10, the dedicated attachment structures 1012 and 1020 functionally limit the ease of operation of the mammography system 1010. Further, the requirement of the separate bucky 1014 for each of the detector 1018 and the biopsy positioner 1024 greatly increases the cost and complexity of these components of the mammography system 1010.

Figure 2A:
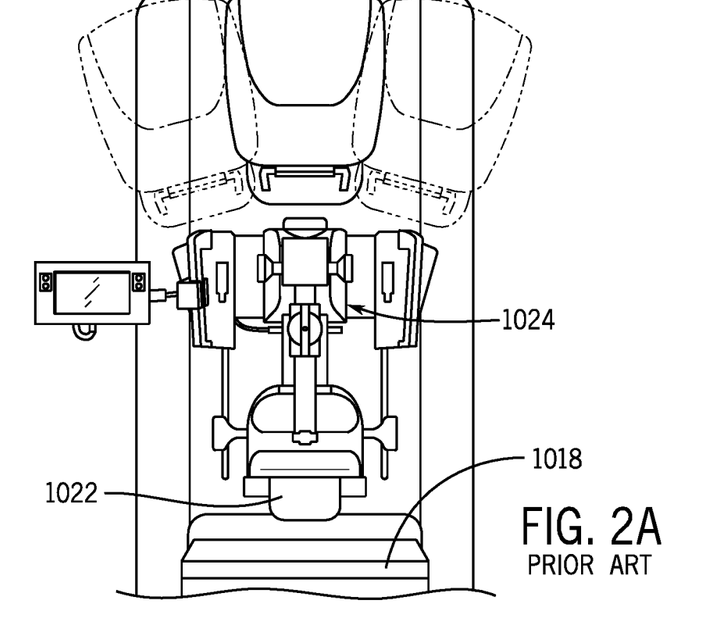
FIGS. 2A and 2B are front elevation views of a biopsy positioner attached to a mammography device to position a biopsy device in a vertical orientation and in a lateral orientation.
Figure 2B:
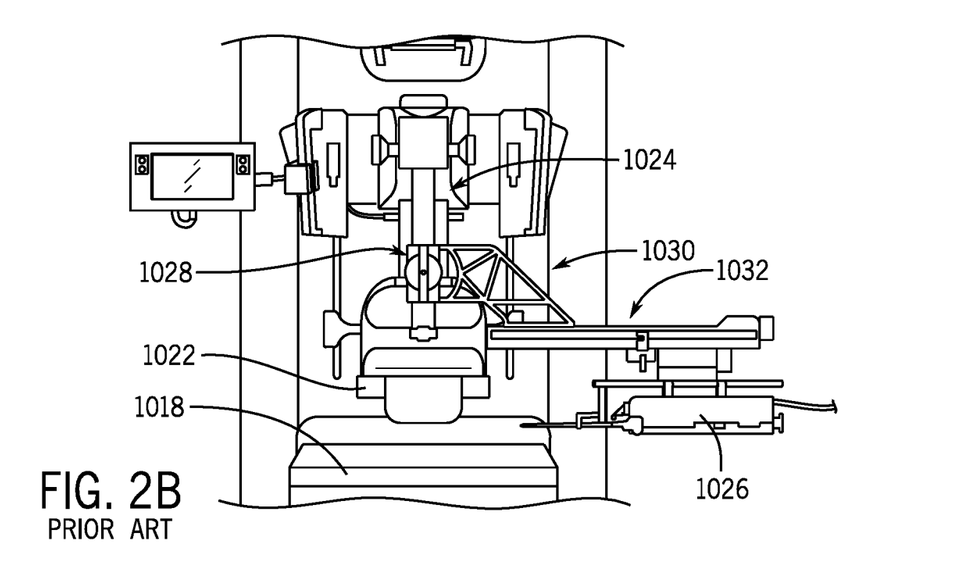

In addition, with particular regard to the prior art biopsy positioner 1024, as illustrated in FIGS. 2A and 2B, the biopsy positioner 1024 is attached to the gantry 1016 in a specified location to a dedicated positioner attachment structure 1028 disposed above the detector 1018. The structure 1028 can move vertically on the gantry 1016 with regard to the detector 1018 along with the paddle 1022, which may also be disposed directly on the positioner 1024, in order to place the biopsy device 1026 attached to the positioner 1024 in a location to interact with a breast compressed between the paddle 1022 and the bucky 1014/detector 1018 in the performance of a biopsy procedure. In this configuration, best shown in FIG. 2A, the biopsy device 1026 is secured to the positioner 1024 in a vertical orientation, such that the movement of the positioner attachment structure 1028 can move the positioner 1024 and the biopsy device 1026 secured thereto vertically with regard to the paddle 1022 and bucky 1014/detector 1018.

However, when it is desired to access a region of interest (ROI) in a biopsy procedure form a lateral orientation, as best shown in FIG. 2B, the structure of the biopsy positioner 1024 does not allow for the positioning of the biopsy device 1026 in an orientation other than vertically on the positioner 1024. As a result, it is necessary to use a lateral kit 1030 including a lateral arm 1032 engaged with the positioner 1024 in order to enable the biopsy device 1026 to be secured to the positioner 1024 in a lateral orientation relative to the breast (not shown) disposed between the bucky 1014/detector 1018 and the paddle 1022. The lateral arm 1032 operates to provide an attachment location for the biopsy device 1026 that is in a lateral orientation relative to the breast compressed between the paddle 1022 and the bucky 1014/detector 1018.

However, while the lateral arm 1032 enables the biopsy device 1026 to be disposed in a lateral orientation for a biopsy procedure, the arm 1032 must be disengaged and re-attached to the positioner 1024 when it is necessary to perform a biopsy procedure on the opposed side of the breast, requiring significant time and effort. Further, in order to support the weight of the biopsy device 1026, and the lateral arm 1032 itself, the lateral arm 1032 is formed of a metal material to enable the arm 1032 to support the combined weight of the arm 1032 and the device 1026, as well as any other required components, such as a needle guide. Also, as a result of its construction, the entire positioner 1024 is designed as a field replaceable unit, such that an entire new positioner 1024 is required as a replacement when any component of a prior art positioner 1024 become defective or otherwise inoperable.

Therefore, with regard to the aforementioned shortcomings of prior art mammography imaging systems, particularly concerning the biopsy positioner utilized with the mammography systems, it is desirable to develop an improved mammography system and biopsy positioner structure with an associated method for securing a biopsy device thereto for the operation of the of the mammography system in a biopsy procedure.

SUMMARY OF THE DISCLOSURE

According to one aspect of an exemplary embodiment of the present disclosure, a mammography system includes a gantry having a radiation source, a detector adapted to receive radiation emitted from the radiation source to generate image data and defining a compression surface, a first support structure moveably disposed on the gantry between the radiation source and the detector, and a second support structure moveably disposed on the gantry between the radiation source and the detector, a controller operably connected to the gantry to control the operation of the radiation source and detector to generate the image data, the controller including a central processing unit and interconnected electronic memory unit for processing the image data from the detector, and a biopsy positioner attached to one of the first support structure or the second support structure, the biopsy positioner including a base engaged with the first support structure or the second support structure, and a positioning arm connected to the base, the positioning arm including a first arm moveably connected to the base and a second arm moveably connected to the first arm, wherein the first arm is moveable between lateral positions on opposed sides of the base.

According to still another aspect of an exemplary embodiment of the present disclosure, a biopsy positioner adapted to be secured to a medical imaging system for performing a biopsy procedure thereon includes a base adapted to be engaged with a support structure on the medical imaging system, and a positioning arm connected to the base, the positioning arm including a first arm moveably connected to the base and a second arm moveably connected to the first arm, wherein the first arm is moveable between lateral positions on opposed sides of the base.

According to still another aspect of an exemplary embodiment of the present disclosure, a method for performing a biopsy procedure on an imaging system includes the steps of providing an imaging system including a gantry having a radiation source, a detector defining a compression surface, a first support structure moveably disposed on the gantry to move along a compression axis between the radiation source and the detector and including a first component attachment structure, and a second support structure moveably disposed on the gantry to move along a compression axis between the radiation source and the detector, a controller operably connected to the gantry to control the operation of the radiation source and detector to generate image data, and to control the movement of the first support structure and the second support structure, the controller including a central processing unit and interconnected electronic memory unit for processing the image data from the detector, a display operably connected to the controller for presenting information to a user, and a user interface operably connected to the controller to enable user input to the controller, engaging a first component with one of the first support structure or the second support structure, engaging a biopsy positioner with the other of the first support structure or the second support structure, the biopsy positioner having a base adapted to be engaged with one of the first or second support structures on the imaging system, and a positioning arm connected to the base, the positioning arm including a first arm moveably connected to the base and a second arm moveably connected to the first arm, wherein the first arm is moveable between lateral positions on opposed sides of the base, moving the first component along the compression axis between the radiation source and the detector, moving the biopsy positioner along the compression axis, adjusting the positioning arm to locate a biopsy device in one of a vertical orientation, or either lateral orientation relative to the base, and operating the biopsy device to perform the biopsy procedure.

These and other exemplary aspects, features and advantages of the invention will be made apparent from the following detailed description taken together with the drawing figures.

BRIEF DESCRIPTION OF THE DRAWINGS

The drawings illustrate the best mode currently contemplated of practicing the present invention.

In the drawings.

DETAILED DESCRIPTION OF THE DRAWINGS

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

As used herein, "electrically coupled", "electrically connected", and "electrical communication" mean that the referenced elements are directly or indirectly connected such that an electrical current may flow from one to the other. The connection may include a direct conductive connection, i.e., without an intervening capacitive, inductive or active element, an inductive connection, a capacitive connection, and/or any other suitable electrical connection. Intervening components may be present.

Further, while the embodiments disclosed herein are described with respect to a mammography apparatus for the 2-dimensional imaging of breast tissue, it is to be understood that embodiments of the invention may be applicable to other types of imaging devices for both 2-dimensional and 3-dimensional imaging including, for example, fluoroscopy, full-filed digital mammography, digital breast tomosynthesis (DBT) and spectral mammography (single or multi-energy), as well as for imaging procedures for tissue other than breast tissue. Further still, embodiments of the invention may be used to analyze tissue, generally, and are not limited to analyzing human tissue.

Figure 3:
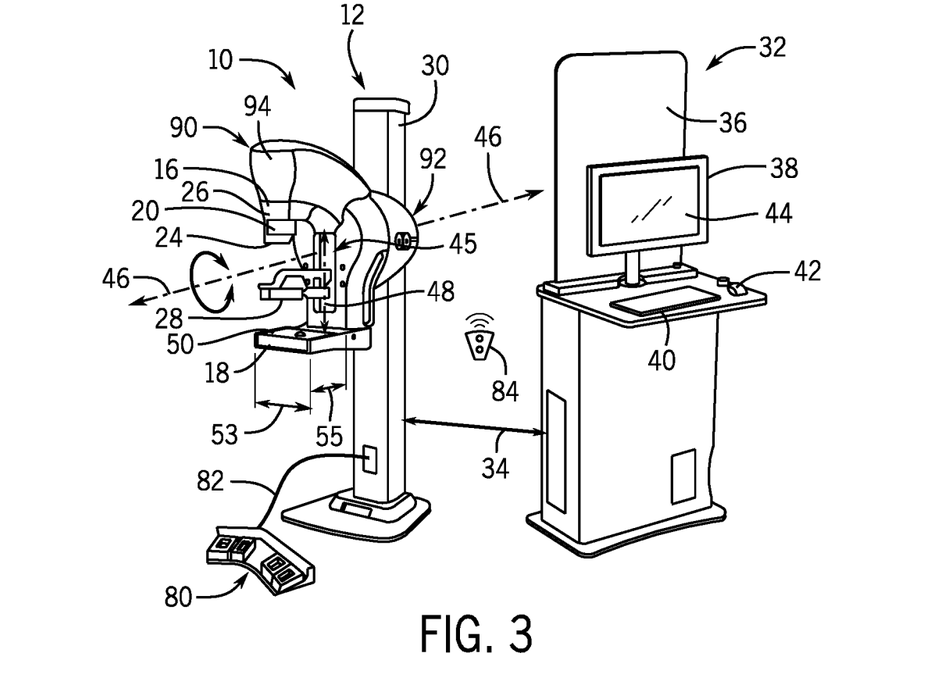
FIG. 3 is a perspective view of an imaging device in the form of a mammography apparatus for imaging the breast tissue of a patient, in accordance with an embodiment of the disclosure.
Figure 4:
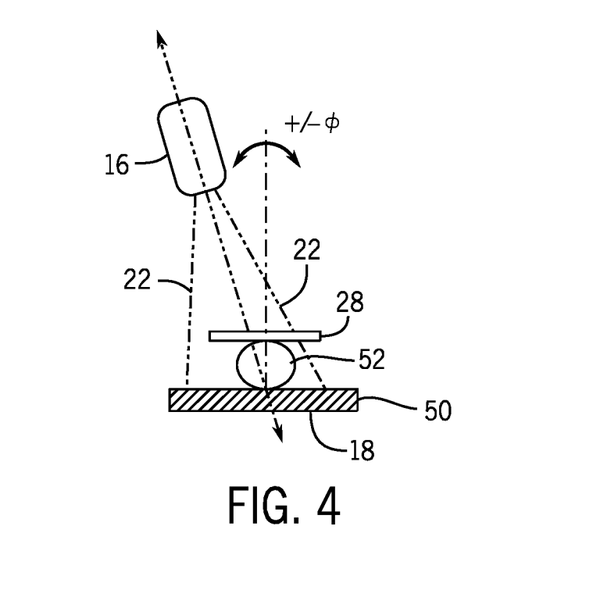
FIG. 4 is a diagram of the system of FIG. 3, showing the radiation source of the system in a scanning position, in accordance with an embodiment of the disclosure.

Referring now to FIGS. 3 and 4, the major components of an exemplary imaging system 10 formed as a mammography device or system 12 for imaging breast tissue according to an embodiment of the invention are shown. The system 10, such that disclosed in US Patent Application Publication No. US20200060632, entitled Apparatus And Method For Mammographic Breast Compression, and U.S. patent application Ser. No. 18/110,062 entitled Mammography Imaging System with Universal Attachment Structures, the entirety of which are each expressly incorporated herein by reference for all purposes, includes a radiation source/x-ray source 16, a radiation detector 18, and a collimator 20. The radiation source 16 is movable between a variety of imaging positions relative to the detector 18, and is operative to emit radiation rays 22 (FIG. 4) that are received by the radiation detector 18 to provide an image of an object, such as a breast 52. In embodiments, the system 10 may include a patient shield 24 mounted to the radiation source 16 via face shield rails 26 to prevent the patient's head from obstructing the radiation rays and protecting the patient from the radiation rays 22.

Referring still further to FIGS. 3 and 4, the system 10 also includes a compression paddle or plate 28 and a support structure 30 to which one or more of the radiation source 16, radiation detector 18, and/or compression plate 28 are mounted. In embodiments, the system 10 may further include a controller 32. The controller 32 may be a workstation having at least one processor/central processing unit/computer and a memory device/database that stores information and/or instructions for the operation of the system 10 that are employed by the controller 32, as shown in FIG. 3 or, in other embodiments, the controller 32 may be embedded/integrated into one or more of the various components of the system 10 disclosed above. In embodiments, the controller 32 may be in electrical communication with the radiation source 16, radiation detector 18, and/or the compression plate 28 via a cable 34. As will be appreciated, in embodiments, the connection 34 may be a wireless connection. In embodiments, the controller 32 may include a radiation shield 36 that protects an operator of the system 10 from the radiation rays 22 emitted by the radiation source 16. The controller 32 may further include a display 38, a keyboard 40, mouse 42, and/or other appropriate user input devices that facilitate control of the system 10 via a user interface 44.

As further shown in FIGS. 3 and 4, the radiation source 16, along with the radiation detector 18, forms part of an x-ray system which provides x-ray imagery for the purpose of imaging a body part of a patient, such as breast 52. As stated above, the radiation source 16 emits the radiation rays 22 such that the radiation rays 22 travel from the radiation source 16 to the radiation detector 18. While the radiation rays 22 are discussed herein as being x-rays, it is to be understood that the radiation source 16 may emit other types of electromagnetic rays which can be used to image a patient. The radiation source 16 may be mounted to the support structure 30 such that the radiation source can rotate around an axis 46 in relation to the radiation detector 18, although movement of the radiation source 16 in paths other than rotation about a fixed axis, such as during digital breast tomosynthesis (DBT), are also envisioned. In embodiments, the radiation detector 18 may be configured to rotate or translate within its housing, such as in the directions indicated by arrows 53 and 55.

In the illustrated exemplary embodiment of FIG. 3 the radiation source 16 and the detector 18 are mounted to a gantry 90 that is secured to the support structure 30. The support structure 30 houses a translation mechanism 92 that is operably connected to the gantry 90. The translation mechanism 92 is operable to move the gantry 90 vertically with respect to the support structure 30 in order to position the gantry 90 at the appropriate height to accommodate the dimensions of the patient on which the system 10 is being utilized. The translation mechanism 92 is also operable to rotate the gantry 90 relative to the support structure 30 about the horizontal axis 46 in order to position the gantry 90 rotationally with regard to the patient, as necessary.

The gantry 90 includes a generally C-shaped body 94 with the radiation source 16 at one end and the detector 18 at the opposite end. In this configuration, regardless of the vertical and/or rotational orientation of the gantry 90, such as to position the radiation source 16 and detector 18 relative to the patient breast 52 to obtain x-ray images at various orientations, such as for craniocaudal (CC) or mediolateral oblique (MLO) views, among others, the radiation source 16 is disposed in alignment with the detector 18. In this position, the detector 18 is capable of receiving the x-rays 22 emitted from the radiation source 16 that pass through the portion of the patient, i.e., patient breast 52, located between the radiation source 16 and the detector 18 in order to generate image data for transmission to the control system 32 of the mammography device/system 10 to create/reconstruct a 3D image dataset for viewing by a physician, such as by using DBT, among other known methods.

Additionally, in another embodiment the radiation source 16 can be attached to the gantry 90 to rotate and/or move independently of the gantry 90 and detector 18 in order to enable the radiation source 16 to take x-ray images of the patient breast at various angles relative to the detector 18, e.g., between +/−60°. The images obtained between these angles for the radiation source 16 can be used either for creation of stereoscopic images in a biopsy procedure using the system 10 or for DBT when operating the system 10 in an imaging mode.

As stated above, the radiation detector 18 receives the radiation rays 22 emitted by the radiation source 16. In embodiments, data regarding the radiation rays 22 received by the radiation detector 18 may be electrically communicated to the controller 32 from the radiation detector 18 via cable/electronic connection 34 such that the controller 32 generates one or more images which may be shown on the display 38 and stored in the memory device.

The compression plate 28 is operative, in response to instruction from the controller 32 or in response to instructions from controller(s) on or near the mammography system 10, such as remote control, 84, or switch controllers 80 connected by cable 82, to move towards and away from the radiation detector 18 as indicated by arrows/compression axis 48 such that the compression plate 28 flattens and holds a body part, e.g., breast 52, in place against the support housing or surface 50 of the radiation detector 18. In this respect, the radiation detector 18 and in particular the housing or surface 50 thereof is referred to herein as a "compression surface or support plate" that cooperates with the compression plate 28 to compress and clamp a breast of a patient therebetween.

Figure 5:
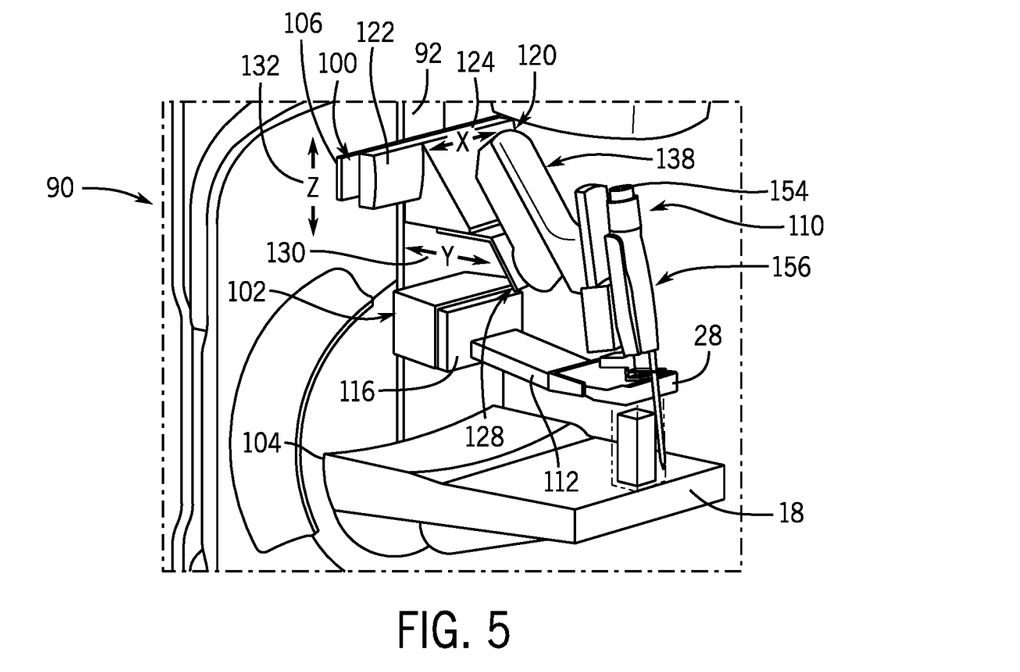
FIG. 5 is an isometric view of the mammography system of FIG. 3 including a biopsy positioner in a vertical orientation and a paddle secured to the mammography system, in accordance with an embodiment of the disclosure.

In one exemplary embodiment illustrated in FIG. 5, the gantry 90 includes a first support structure 100 and a second support structure 102 each of which are operably connected to a compression axis movement mechanism 45 located on and/or within the gantry 90 that is able to move each of the first support structure 100 and the second support structure 102 relative to the gantry 90 along the compression axis 48, e.g., vertically in the orientation of the gantry 90 shown in FIG. 5, and optionally in other directions and/or to rotate relative to the gantry 90. The first support structure 100 and the second support structure 102 are independently connected to the movement mechanism 45, or to separate and aligned movement mechanisms 45, such as mechanisms 45 oriented in a side-by-side configuration within the gantry 90, such that each of the first support structure 100 and the second support structure 102 are separately moveable with regard to the gantry 90. The movement mechanism 45 is operable within the gantry 90 at any rotational or vertical position of the gantry 90 to move the first support structure 100 and/or the second support structure 102 in a line either towards or away from the detector 18/support plate. The movement mechanism 45 can have any of a number of different configurations, but in one exemplary embodiment takes the form of a compression screw mechanism that is operable to move a component 114 attached to one of the first support structure 100 and the second support structure 102 plate 28 into engagement with the patient breast 52 to exert a predetermined pressure/compression on the breast 52 to retain the breast 52 in a stationary position between the plate 28 and the detector 18/support plate during imaging and/or biopsy procedures.

Along with the first support structure 100 and the second support structure 102, the gantry 90 includes a detector support structure 104. The detector support structure 104 is disposed at a conventional location for the disposition of the radiation detector 18, or bucky, as in prior art mammography systems. However, the detector support structure 104 is constructed to be fixed with regard to the gantry 90 such that the detector 18 is also fixed to the gantry 90. Further, in one exemplary embodiment, the detector 18 can be fixed to the detector support structure 104, such that the detector 18 is not removable from the gantry 90 in normal operation of the mammography system 10.

With the detector 18 mounted in a non-releasable manner to the detector support structure 104, the first support structure 100 and the second support structure 102 can be configured to include differing or universal component attachment structures 106, such as any suitable mechanical, e.g., spring-biased pin, and/or electrical attachment structures, or combinations thereof that allow the interconnection of a number of various components of the mammography system 10 to each of the first support structure 100 and the second support structure 102. For example, the first support structure 100 and the second support structure 102 can each include both mechanical and electrical connections for any component 114 to be secured thereto in order to provide an interconnection that both mechanically holds and supports the component 114 on the first support structure 100 and the second support structure 102 and electrically connects the component 114 with the controller 32 to enable the controller 32 to provide any required power or control signals to the component 114 and to receive any data or feedback from the component 114 engaged with either of the first support structure 100 or the second support structure 102.

Referring now to FIG. 5, in one exemplary embodiment of the disclosure, a biopsy positioner 110 is attached to the first support structure 100, and a compression paddle 28 is attached to the second support structure 102. The paddle 28 is disposed at one end of an arm 112 that extends outwardly from a plate 116 secured to the second support structure 102. As a result of the relatively short length of the arm 112 compared to prior paddle support arms, the arm 112 can be formed from a plastic material, significantly reducing the overall weight of the paddle 28. Further, the shorter arm 112 reduces the amount of play or movement of the arm 112 and paddle 28 while compressing the breast 52 to enhance the compression force stability of the paddle 28 to securely hold the breast 52 in the compressed position.

The biopsy positioner 110 in the illustrated exemplary embodiment includes a base 120 that is operably connected to the first support structure 100. The base 120 includes a securing portion 122 that is engaged directly with the first support structure 100 and that is adjustable in the direction indicated by arrow 124 relative to the first support structure 100 via a suitable translation mechanism (not shown) disposed within the securing portion 122. The base 120 further includes a support portion 126 that extends outwardly from the securing portion 122. The support portion 126 is engaged with an adjustment portion or plate 128 that is moveable relative to the support portion 126 in the direction indicated by the arrow 130. Thus, in conjunction with the movement of the first support structure 100 in a vertical direction indicated by the arrow 132, the biopsy positioner 110 is able to move along each of the three axes X, Y, Z in order to locate the biopsy positioner 110 as desired.

In this configuration, as the paddle 28 is attached to the second support structure 102 below the first support structure 100 and biopsy positioner 110, the movement of the paddle 28 to achieve the desired compression of the breast does not interfere with the movement of the movement of the positioner 110. More specifically, in one exemplary embodiment, the paddle 28 can be secured to the second support structure 102 and moved to compress the breast 52 between the paddle 28 and the detector surface 50 as desired. Subsequently, and optionally after the completion of a diagnostic imaging procedure of the compressed breast 52 using the mammography system 10, the biopsy positioner 110 can be attached to the first support structure 100 and moved into position by the movement mechanism 45 and the first support structure 100 to perform the biopsy procedure on the compressed breast 52, with the first support structure 100 moving the biopsy positioner 110 away from the paddle 28 and breast 52 after completion of the biopsy procedure. The second support structure 102 and the paddle 28 can also be moved away from the breast 52 to remove the compression of the breast 52 concurrently with or subsequently to the movement of the first support structure 100.

Figure 6:
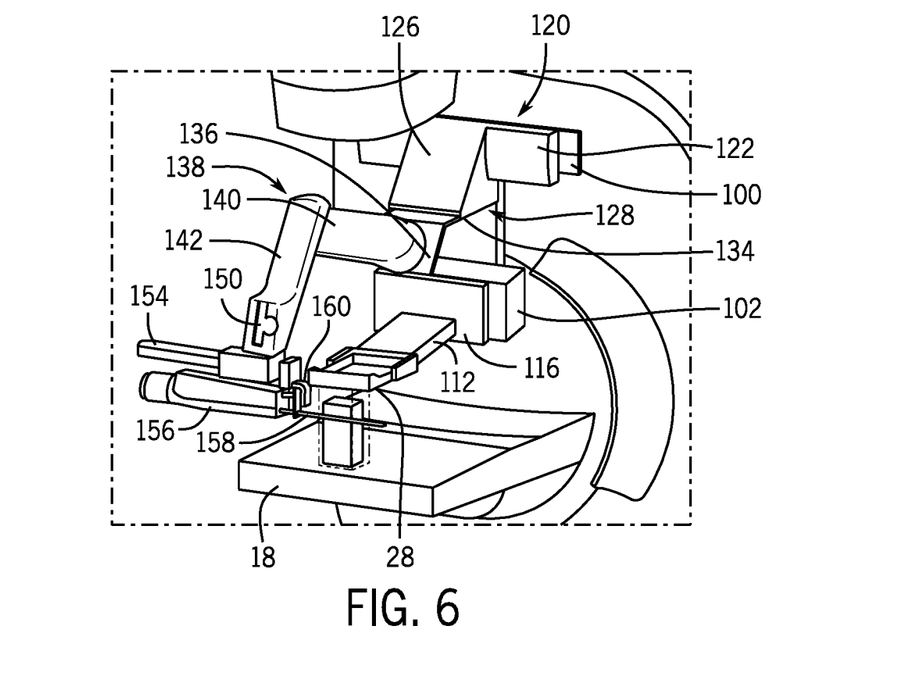
FIG. 6 is an isometric view of the mammography system of FIG. 3 including a biopsy positioner in a horizontal orientation and a paddle secured to the mammography system, in accordance with an embodiment of the disclosure.

Referring now to FIGS. 5 and 6, the adjustment plate 128 is formed with first panel 134 moveably secured to the support portion 126, and a second panel 136 attached to one end of the first panel 134 and extending outwardly at an angle with regard to the first panel 134. The second panel 136 operates to support a positioning arm 138 thereon. The positioning arm 138 includes a first arm 140 rotatably attached to the second panel 136, and a second arm 142 rotatably secured to the first arm 140. The first arm 140 can rotate with regard to the second panel 136 between a first position shown in FIG. 5 where the first arm 140 is disposed in alignment with the support portion 126 and the second panel 136 (the vertical position), and a second position shown in FIG. 6 where the first arm 140 is disposed at a 90° angle from the first position (a lateral or horizontal position). The first arm 140 can also be rotated in the opposite direction from the position shown in FIG. 6, such that the first arm 140 is positioned at either ±90° relative to the second panel 136 (opposed lateral or horizontal positions). The first arm 140 can include a first rotation mechanism 144 engaged between the first arm 140 and the second panel 136 that enables free rotation of the first arm 140 relative to the second panel 136, but that provides a stop to the rotation when the first arm 140 reaches either ±90° position with respect to the second panel 136.

The second arm 142 is rotatably secured to the first arm 140 opposite the second panel 136. As shown in FIG. 6, the second arm 142 can rotate with regard to the first arm 140 in order to maintain the second arm 142 in an orientation parallel to the second panel 136, or at an orientation of ±90° relative to the first arm 140. A second rotation mechanism 146 engaged between the first arm 140 and the second arm 142 can be formed similarly to the first rotation mechanism 144 to provide a range of 180° of rotation of the second arm 142 relative to the first arm 140 between the ±90° positions. Further, the second rotation mechanism 146 can include a locking or control knob 148 that controls the operation of the second rotation mechanism 146. In an alternative embodiment, the first and second mechanisms 144,146 can be engaged and/or synched with one another, such that the control knob 148, e.g., disengagement of the control knob 148, can enable synchronized and concurrent movement and/or rotation of the second arm 142 relative to the first arm 140, and rotation of the first arm 140 relative to the second panel 136.

Opposite the first arm 140, the second arm 142 includes a pair of device slots 150,152 (FIG. 12) adapted to receive and engage a complementary securing structure or tab 153 located on a device support 154. The slots 150,152 are oriented on the second arm 142 such that slot 150 can engage and hold the device support 154 in generally vertical orientation, while slot 152 can engage and hold the device support 154 in horizontal orientation. The device support 154 is operably connected to a biopsy device or gun 156 including a needle 158 used to obtain the biopsy from the breast 52. A needle guide 160 can also be located on the device support 154 in order to provide a visual indication of the orientation of the needle 158 with respect to the breast 52, and particularly with regard to the insertion point for the needle 158.

Figure 7:
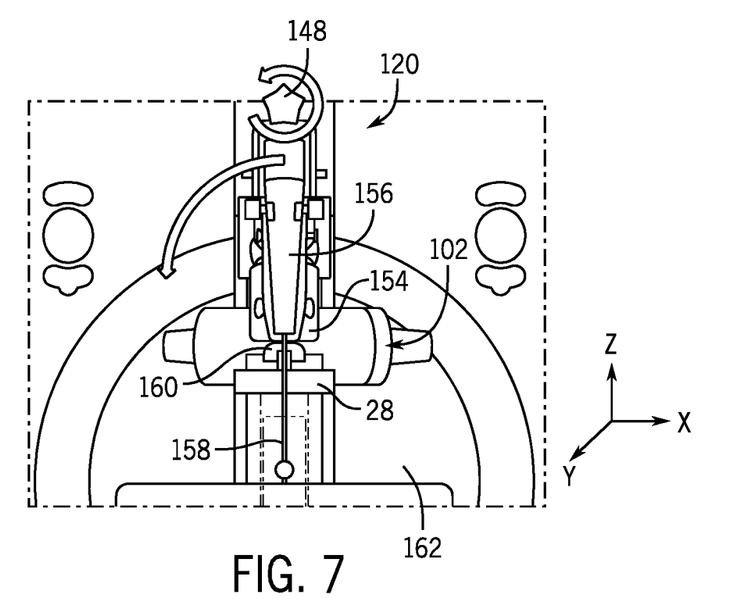
FIG. 7 is a front elevation view of the biopsy positioner of FIG. 5 in a vertical orientation, in accordance with an embodiment of the disclosure.
Figure 8:
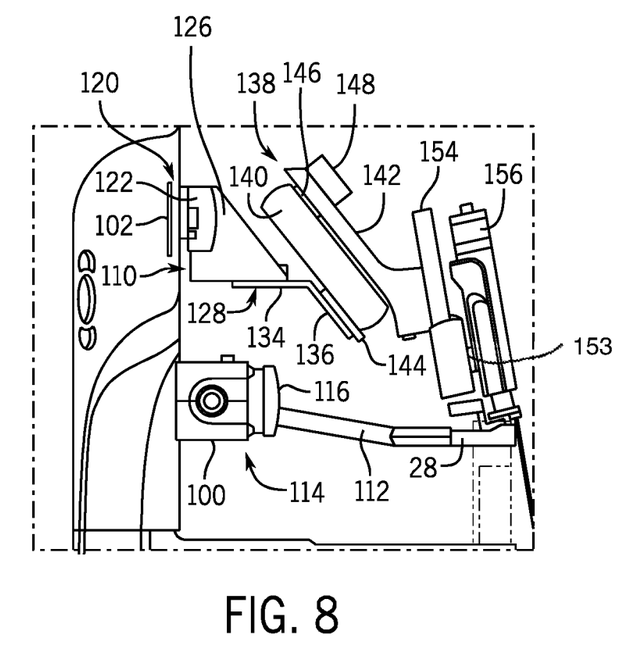
FIG. 8 is a side elevation view of the biopsy positioner of FIG. 7, in accordance with an embodiment of the disclosure.

Looking now at FIGS. 7-12, an exemplary embodiment of the method of employing the biopsy positioner 110 including the positioning arm 138 is illustrated. Referring now to FIGS. 7 and 8, the biopsy positioner 110 and biopsy device 156 are illustrated in a vertical orientation, where the needle 158 is positioned beyond the paddle 28 in order to enable the needle 158 to be inserted into a breast 52 compressed between the paddle 28 and the bucky/detector surface 50. In this position, the angles and/or positions of the second panel 136, the positioning arm 138 and the device support 154 position the biopsy device 156 at a desired angle with regard to the breast 52, such as an angle of approximately 10° with respect to vertical. In one exemplary embodiment, the positioning arm 138 is disposed at an angle of approximately 38° from vertical to locate the biopsy device 156 at the desired 10° with respect to vertical/vertical tilt. Further, in order to position the biopsy device 156/needle 158 as required for the vertical biopsy procedure, second support structure 102 can be moved vertically along the z-axis, and the base 120 can be moved in each of the x- and y-axes as identified in the coordinate axis reference 162 in FIG. 7 through the movement of the securing portion 122 and the adjustment plate 128 relative to the second support structure 102 and to one another.

Figure 9:
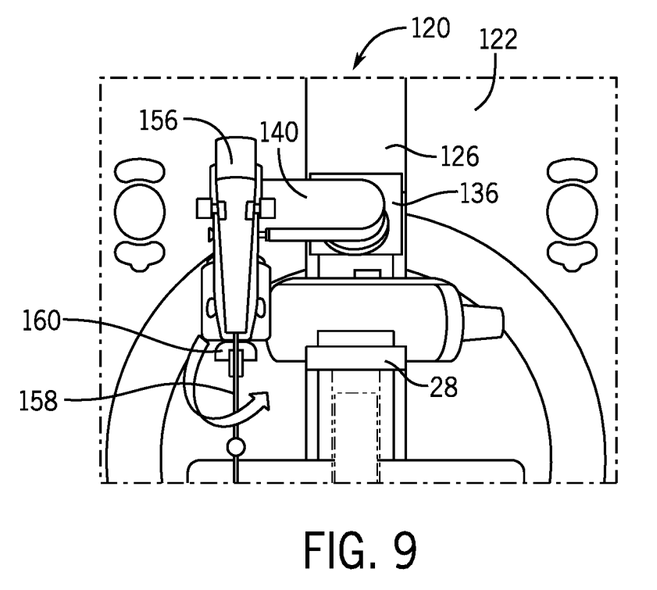
FIG. 9 is a front elevation view of the biopsy positioner of FIG. 5 in a transitional orientation, in accordance with an embodiment of the disclosure.
Figure 10:
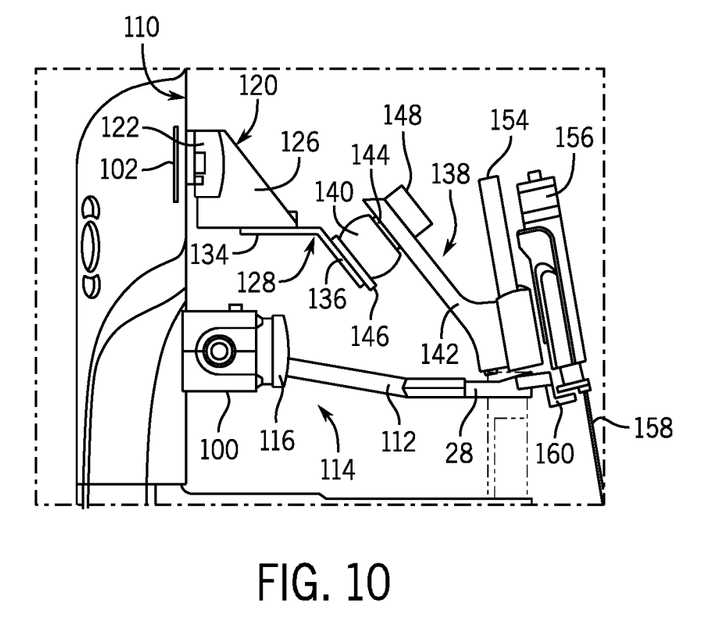
FIG. 10 is a side elevation view of the biopsy positioner of FIG. 9, in accordance with an embodiment of the disclosure.

When it is desired to perform a biopsy procedure laterally from either side of the breast 52, with reference now to FIGS. 9 and 10, in one exemplary embodiment, initially the biopsy device 156 is disengaged from within the vertical device slot 150. However, it is also contemplated that the biopsy device 156 can remain engaged within the vertical device slot 150 during the movement of the positioning arm 138 between the vertical orientation and the lateral orientation.

The control knob 148 is operated, e.g., rotated, to unlock and/or enable the operation of one or both of the first rotation mechanism 144 and the second rotation mechanism 146, such as by releasing the compressive locking forces provided by the control knob 148 between the first arm 140 and the second arm 142. Upon disengagement of the control knob 148 to allow movement of the first arm 140 and the second arm 142, the order of the movement of the first arm 140 and the second arm 142 relative to one another can be performed in any order. Thus, the first rotation mechanism 144 enables the second arm 142 to rotate to either side of the breast 52, such that the first arm 140 is disposed at an angle of +90° relative to the second plate 136. Further, the second arm 142 is rotated via the second rotation mechanism 146 to dispose the second arm 142 at an angle of +90° relative to the first arm 140. In this position, in the embodiment here the biopsy device 156 remains attached to the device support 158 the biopsy device 156 is still oriented in a vertical configuration, but to one side of the breast 52 and paddle 28, as shown in FIGS. 9 and 10. Further, the movement of the first arm 140 and the second arm 142 can be performed by moving the arms 140,142 directly, or by moving the control knob 148 to consequently move the arms 140,142. The first arm 140 and second arm 142 can be secured in the desired lateral position be re-engaging the locking or control knob 148 with the first arm 140.

Figure 11:
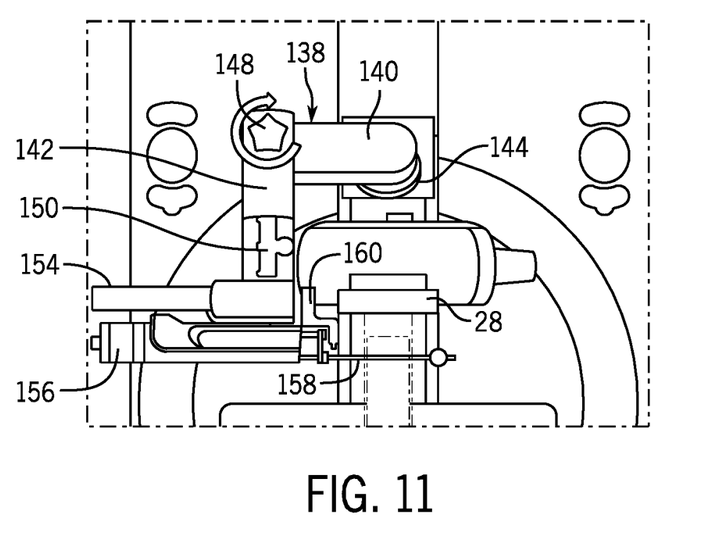
FIG. 11 is a front elevation view of the biopsy positioner of FIG. 5 in a lateral orientation, in accordance with an embodiment of the disclosure.
Figure 12:
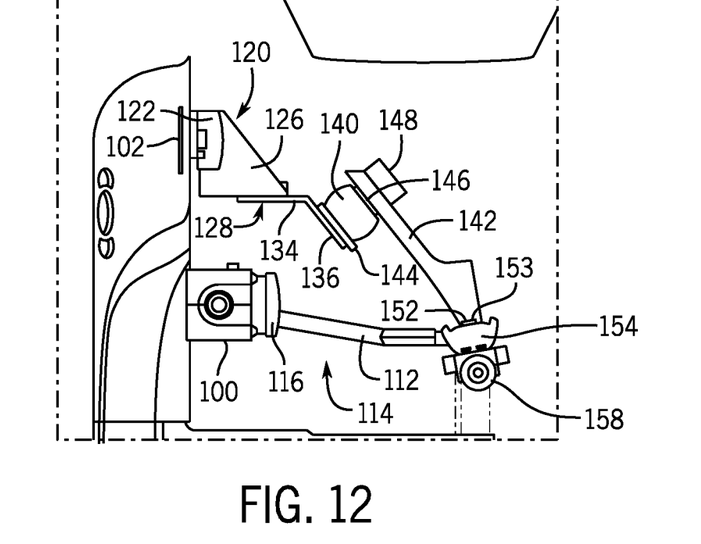
FIG. 12 is a side elevation view of the biopsy positioner of FIG. 11, in accordance with an embodiment of the disclosure.

Looking now at FIGS. 11 and 12, the location of the second arm 142 to one side of the breast 52 enables the device support 154 to be engaged with the lateral device slot 152 in order to locate the device support 154 and the biopsy device 156 in a horizontal orientation relative to the paddle 28, support surface 50 and the breast 52. The placement on the second arm 142 of the lateral device slot 152 relative to the vertical device slot 150 allows for compensation of the position of the biopsy device 156 and needle 158 in relation to the paddle 28 based upon the forward movement of the end of the second arm 142 when moved into the lateral position of FIGS. 11 and 12.

Figure 13:
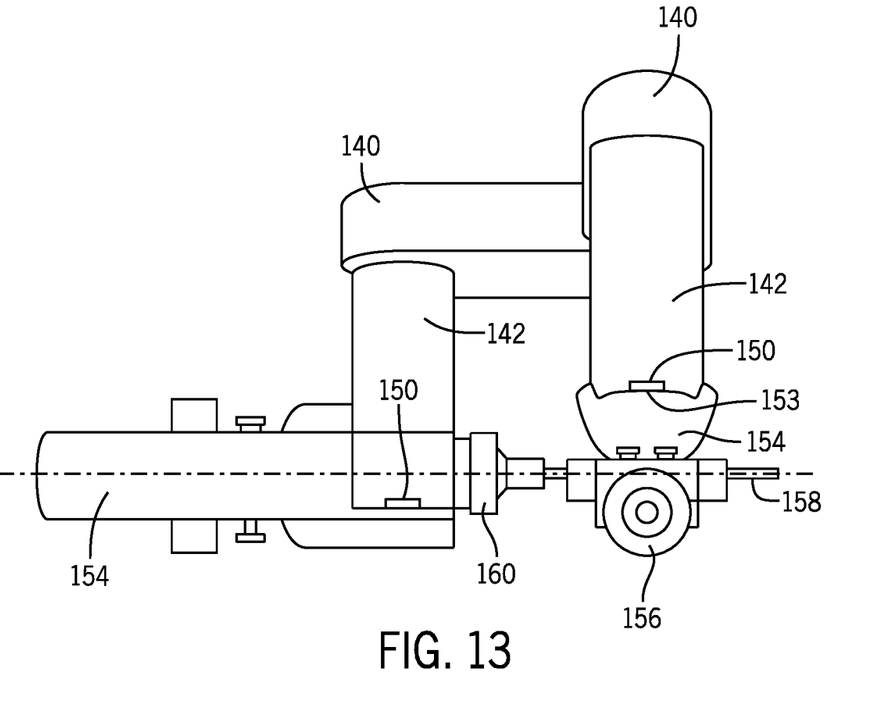
FIG. 13 is a top pan view of a positioning arm of the biopsy positioner of FIG. 5 in both vertical and lateral orientations.

In addition, the orientation of the lateral device slot 152 on the second arm 142 enables the biopsy device 156 and needle 158 to be disposed close to the support surface 50 and at an angle of 0° relative to the chest of the patient, i.e., with 0° forward tilt of the needle 158, as shown in FIG. 13. Further, as the device support 154 remains in the same orientation relative to the biopsy device 156 and needle 158 in each of the vertical and lateral orientations for the biopsy positioner 110/positioning arm 138, the device support 154 can include the needle guide 160, which can be formed as a laser needle guide 160.

Other alternative embodiments are contemplated as being within the scope the preceding disclosure and the following claims. For example, the construction of one or more of the base 120, the adjustment plate 128, the positioning arm 138 and the device support 154 can be formed from a plastic material to significantly reduce the overall weight of the biopsy positioner 110. Also, the movement of the first arm 140 and second arm 142 can be controlled by a suitable motor (not shown) and control mechanism of the mammography device or system 100, rather than by manually controlling the control knob 148. Also, the device support 154 can include a suitable pivoting mechanism (not shown) that allows the portion of the device support 154 connected to the biopsy device 156 to move the biopsy device 156 automatically between the vertical and lateral orientations. Further, the biopsy device 156 can be operably connected to the mammography system 100 in any suitable wired or wireless manner to enable the controller 32 to operate the biopsy device 156 in conjunction with the movement of the biopsy positioner 110 during the performance of a vertical or lateral biopsy procedure. Also, because the biopsy device 156 is completely separable from the remainder of the biopsy positioner 110, the biopsy device 156 can be a field replaceable unit (FRU) separate from the biopsy positioner 110, which can be reused with a different, replacement biopsy device 156.

In all configurations of the components 114 attached to the first support structure 100 and the second support structure 102, because the detector 18 is disposed in a fixed position on the gantry 90 separate from the first support structure 100 and the second support structure 102, all components 114 can be simplified in their construction, e.g., with without the need for specialized attachment structure and/or a bucky and/or breast support surface thereon. Further, the movement of the first support structure 100 and the second support structure 102 via the movement mechanism(s) 45 can be independent of one another, allowing for precise control of the positioning of the components 114 secured to each of the first support structure 100 and the second support structure 102 in any desired configuration on the gantry 90.

It is understood that the aforementioned compositions, apparatuses and methods of this disclosure are not limited to the particular embodiments and methodology, as these may vary. It is also understood that the terminology used herein is for the purpose of describing particular exemplary embodiments only, and is not intended to limit the scope of the present disclosure which will be limited only by the appended claims.

We claim:

1. A mammography system comprising:
   a. a gantry comprising:
      i. a radiation source;
      ii. a detector adapted to receive radiation emitted from the radiation source to generate image data and defining a compression surface;
      iii. a first support structure moveably disposed on the gantry between the radiation source and the detector; and
      iv. a second support structure moveably disposed on the gantry between the radiation source and the detector;
   b. a controller operably connected to the gantry to control the operation of the radiation source and detector to generate the image data, the controller including a central processing unit and interconnected electronic memory unit for processing the image data from the detector; and
   c. a biopsy positioner attached to one of the first support structure or the second support structure, the biopsy positioner comprising:
      i. a base engaged with the first support structure or the second support structure; and
      ii. a positioning arm connected to the base, the positioning arm including a first arm moveably connected to the base and a second arm moveably connected to the first arm,
   wherein the first arm is moveable between lateral positions on opposed sides of the base, and
   wherein the first arm is rotatable across an angular range of ±90° relative to the base.

2. The mammography system of claim 1, wherein the base further comprises:
   a. a securing portion engageable with the first support structure or the second support structure; and
   b. a support portion attached to the securing portion and extending outwardly from the securing portion, wherein the positioning arm is engaged with the support portion.

3. The mammography system of claim 2, wherein the securing portion is moveable with respect to the first support structure or the second support structure.

4. The mammography system of claim 2, wherein the support portion is moveable relative to the securing portion.

5. The mammography system of claim 2, wherein the second arm is rotatable across an angular range of ±90° relative to the first arm.

6. A mammography system comprising:
   a. a gantry comprising:
      i. a radiation source;
      ii. a detector adapted to receive radiation emitted from the radiation source to generate image data and defining a compression surface;
      iii. a first support structure moveably disposed on the gantry between the radiation source and the detector; and
      iv. a second support structure moveably disposed on the gantry between the radiation source and the detector;
   b. a controller operably connected to the gantry to control the operation of the radiation source and detector to generate the image data, the controller including a central processing unit and interconnected electronic memory unit for processing the image data from the detector; and
   c. a biopsy positioner attached to one of the first support structure or the second support structure, the biopsy positioner comprising:
      i. a base engaged with the first support structure or the second support structure; and
      ii. a positioning arm connected to the base, the positioning arm including a first arm moveably connected to the base and a second arm moveably connected to the first arm,
   wherein the first arm is moveable between lateral positions on opposed sides of the base, and
   wherein the second arm comprises:
      i. a first slot adapted to locate a biopsy device in a vertical orientation on the second arm; and
      ii. a second slot adapted to locate the biopsy device in a lateral orientation on the second arm.

7. A mammography system comprising:
   a. a gantry comprising:
      i. a radiation source;
      ii. a detector adapted to receive radiation emitted from the radiation source to generate image data and defining a compression surface;
      iii. a first support structure moveably disposed on the gantry between the radiation source and the detector; and
      iv. a second support structure moveably disposed on the gantry between the radiation source and the detector;
   b. a controller operably connected to the gantry to control the operation of the radiation source and detector to generate the image data, the controller including a central processing unit and interconnected electronic memory unit for processing the image data from the detector; and
   c. a biopsy positioner attached to one of the first support structure or the second support structure, the biopsy positioner comprising:
      i. a base engaged with the first support structure or the second support structure; and
      ii. a positioning arm connected to the base, the positioning arm including a first arm moveably connected to the base and a second arm moveably connected to the first arm,
   wherein the first arm is moveable between lateral positions on opposed sides of the base, and
   wherein the biopsy device includes a device support engaged with the biopsy device and including a complementary securing structure releasably engageable with each of the first slot and the second slot.

8. The mammography system of claim 7, wherein the biopsy device has a vertical tilt of 10° when engaged with the first slot.

9. The mammography system of claim 7, wherein the biopsy device has a forward tilt of 0° when engaged with the second slot.

10. The mammography system of claim 7, wherein the biopsy device is separable from the device support.

11. A biopsy positioner adapted to be secured to a medical imaging system for performing a biopsy procedure thereon, the biopsy positioner comprising:

i. a base adapted to be engaged with a support structure on the medical imaging system; and ii. a positioning arm connected to the base, the positioning arm including a first arm moveably connected to the base and a second arm moveably connected to the first arm, wherein the first arm is moveable between lateral positions on opposed sides of the base, and wherein the first arm is rotatable across an angular range of ±90° relative to the base.

12. The biopsy positioner of claim 11, wherein the second arm is rotatable across an angular range of +90° relative to the first arm.

13. The biopsy positioner of claim 12, wherein the second arm comprises:
   a. a first slot adapted to locate a biopsy device in a vertical orientation; and
   b. a second slot adapted to locate the biopsy device in a lateral orientation.

14. A method for performing a biopsy procedure on an imaging system, the method comprising the steps of:
   a. providing an imaging system comprising:
      i. a gantry comprising:
         i. a radiation source;
         ii. a detector defining a compression surface;
         iii. a first support structure moveably disposed on the gantry to move along a compression axis between the radiation source and the detector and including a first component attachment structure; and
         iv. a second support structure moveably disposed on the gantry to move along a compression axis between the radiation source and the detector;
      ii. a controller operably connected to the gantry to control the operation of the radiation source and detector to generate image data, and to control the movement of the first support structure and the second support structure, the controller including a central processing unit and interconnected electronic memory unit for processing the image data from the detector,
      iii. a display operably connected to the controller for presenting information to a user; and
      iv. a user interface operably connected to the controller to enable user input to the controller;
   b. engaging a first component with one of the first support structure or the second support structure;
   c. engaging a biopsy positioner with the other of the first support structure or the second support structure, the biopsy positioner comprising:
      i. a base adapted to be engaged with one of the first or second support structures on the imaging system; and
      ii. a positioning arm connected to the base, the positioning arm including a first arm moveably connected to the base and a second arm moveably connected to the first arm,
      wherein the first arm is moveable between lateral positions on opposed sides of the base;
   d. moving the first component along the compression axis between the radiation source and the detector;
   e. moving the biopsy positioner along the compression axis;
   f. adjusting the positioning arm to locate a biopsy device in one of a vertical orientation, or either lateral orientation relative to the base; and
   g. operating the biopsy device to perform the biopsy procedure, wherein the step of adjusting the positioning arm comprises the step of moving the first arm within an angular range of +90° relative to the base.

15. The method of claim 14, wherein the step of adjusting the positioning arm further comprises the step of moving the second arm within an angular range of +90° relative to the first arm.

16. The method of claim 14, wherein the step of adjusting the positioning arm further comprises the step of moving the first arm and the second arm synchronously with one another.

17. The method of claim 14, wherein the step of adjusting the positioning arm further comprises the step of engaging the biopsy device in with a first slot for a vertical orientation on the positioning arm or in a second slot for a lateral orientation on the positioning arm.

* * * * *